United States Patent Office 3,511,670
Patented May 12, 1970

3,511,670
MONO- AND DIACYL GLYCEROL HYDROGEN DICARBOXYLATES AND FOODSTUFFS CONTAINING SAME
Robert Grover Folzenlogen, Green Township, Hamilton County, and James Bruce Martin, Hamilton, Ohio, assignors to The Procter & Gamble Company, Cincinnati, Ohio, a corporation of Ohio
No Drawing. Original application Oct. 29, 1963, Ser. No. 319,698. Divided and this application Dec. 5, 1966, Ser. No. 598,972
Int. Cl. A23d 5/00
U.S. Cl. 99—118         4 Claims

ABSTRACT OF THE DISCLOSURE

Shortenings containing as additives monoacyl glycerol di hydrogen dicarboxylates and/or diacyl glycerol hydrogen dicarboxylates are utilized as ingredients in cake preparation to provide baked cakes of increased volume and as ingredients in icing preparation to provide icings of reduced density. Examples of additives are 1,3-distearin hydrogen succinate and 1-monostearin di hydrogen succinate.

---

This application is a divisional application of application Ser. No. 319,698, filed Oct. 29, 1963, now abandoned.

This invention relates to new organic compounds and, more particularly, to new and novel mono- and diacyl glycerol hydrogen dicarboxylates having utility as additives for bakery products such as bread, cakes, pies, doughnuts, icings, fillings, and the like products prepared from emulsions comprising water, fat, protein, and/or carbohydrates.

The volume, texture, and eating qualities of many bakery products are dependent upon the interaction of various ingredients during the mixing operation in which a dough, batter, or other emulsion is formed and the subsequent baking and/or storage of said bakery product. In accordance with this invention, a new group of edible organic compounds has been discovered which can be incorporated in bakery products for the improvement of volume, texture, and eating qualities. The compounds of this invention are the mono- and diacyl glycerol hydrogen dicarboxylates which are the half esters of dicarboxylic acid containing from 4 to 6 carbon atoms and fatty acid mono- and diester of glycerol, said fatty acid having from 12 to 22 carbon atoms.

The new compounds of this invention can be readily prepared by an esterification reaction between pure glycerol mono- or diester and dicarboxylic acid anhydride. The following are illustrative examples of such methods of preparation. In these examples, the term "mole" is meant to define the weight of a substance in grams, numerically equal to its molecular weight. All percentages are by weight unless otherwise specified.

EXAMPLE 1

1,3-distearin (0.1 mole) was dissolved in 600 ml. water washed, distilled, and dried chloroform. Succinic anhydride (0.2 mole) and 70% perchloric acid (1 ml.) were added to 300 ml. dried (over KOH) and distilled pyridine. The solution of distearin was added to the succinic anhydride in pyridine with stirring during a 30 minute period. The sample was stirred one hour longer and then held 8 days at 80° F. (Shorter holding times also are adequate.) The sample was diluted with water (2 liters) and ethyl ether (1 liter). The organic layer was separated, then washed twice with one liter portions of 8% hydrochloric acid and twice with one liter portions of 4% hydrochloric acid. The organic phase was water washed three times, then dried over anhydrous sodium sulphate and the solvents were evaporated. The product was crystallized from two liters of hexane at 80° F. The crystalline product was dissolved in 1.5 liters of acetone and stirred with 60 g. urea at 40° C. for 4 hours. The filtrate from the adduction with urea was diluted with 2 liters of hexane and then water washed three times. The hexane solution on crystallization at 80° F. yielded 37 g. 1,3-distearin hydrogen succinate as determined by analysis and thin layer chromatographic examination.

EXAMPLE 2

1,3-distearin (0.86 mole) and glutaric anhydride (2.37 moles) were added to 2.6 liters of xylene in a 5 liter round bottom flask equipped with stirrer and condenser. The sample was heated at 130° C. with stirring for 6 hours. The hot reaction product was poured into 8 liters of water and the mixture stirred well and the water layer was discarded. The xylene solution was washed twice more with water after which it was dried with anhydrous sodium sulfate, filtered and allowed to crystallize at 0° F. The crystals from the 0° F. fraction were recrystallized from 3 liters of hexane at 50° F. to yield 336 g. of product. The product was then crystallized successively from (a) 20 volumes of hexane at 50° F., (b) 15 volumes of acetone at 80° F. and 50° F., with retention of the 50° F. fraction and (c) 20 volumes of hexane at 90° F. to yield pure 1,2-distearin hydrogen glutarate as determined by analysis and thin layer chromatographic examination.

Similar preparations were made of 1,2-distearin hydrogen succinate (alternatively named as 1,2-distearoyl-3-hydrogen succinoyl glycerol), 1,3 - distearin hydrogen glutarate, 1-monostearin di hydrogen succinate (alternatively named as 1-stearoyl-2,3-di-hydrogen succinoyl glycerol), and 2-monostearin di hydrogen succinate. Analytical data for these six isomerically pure compounds is set forth in the following table:

TABLE 1.—ISOMERICALLY PURE MONO- AND DIACYL GLYCEROL HYDROGEN DICARBOXYLATES

| Compound | Acid Value | | Saponification value | | Melting points, °C. | |
|---|---|---|---|---|---|---|
| | Observed | Calculated | Observed | Calculated | CMP | MMP |
| 1,2-distearin hydrogen succinate | 77 | 77.5 | 308 | 310 | 77.3 | 55.9 |
| 1,3-distearin hydrogen succinate | 78 | 77.5 | 311 | 310 | 78.7 | 41.6 |
| 1,2-distearin hydrogen glutarate | 76 | 76.1 | 304 | 304 | 65.2 | 51.5 |
| 1,3-distearin hydrogen glutarate | 77 | 76.1 | 304 | 304 | 69.0 | 38.1 |
| 1-monostearin di hydrogen succinate | 197 | 201 | 509 | 503 | 85.9 | 42.0 |
| 2-monostearin di hydrogen succinate | 201 | 201 | 515 | 503 | 78.8 | 33.7 |

CMP = Complete melting point, MMP = Minimum melting point.

The corresponding diglycolic and adipic acid half esters are prepared by substituting an equivalent amount of the appropriate dicarboxylic acid anhydride for the succinic or glutaric acid anhydride in the above reactions.

The half esters of this invention also can be prepared by reaction of the mono- or diacyl glycerol with an appropriate dicarboxylic acid in xylene using p-toluene sulfonic acid catalyst. However, the above methods using the dicarboxylic acid anhydrides are preferable to the method using the dibasic acid.

The new compounds of this invention can be used in shortenings for improving the volume of cakes. For example, 0.5% by weight of 1,3-distearin hydrogen succinate employed in a standard plastic shortening consisting of partially hydrogenated vegetable oil (soybean and cottonseed oils in weight ratio of 85:15) having an iodine value of about 75 increased the volume of a standard quick method white layer cake containing about 10% by weight shortening from 985 cc. to 1185 cc./400 g. batter. The cakes were prepared according to the following formula.

| Ingredients: [1] | Weight in grams |
| --- | --- |
| Cake flour | 107 |
| Granulated sucrose | 133 |
| Sodium chloride | 2.5 |
| Double-acting baking powder | 6.8 |
| Shortening | 47.5 |
| Whole milk | 90 |
| Add: [2] | |
| Fresh egg white | 60 |
| Whole milk | 40 |

Scale 8-inch pans at 400 g. batter.
Baking temperature 365° F.
Baking time 25 minutes.
Cake volume measured 20 minutes after removal from oven.

[1] Mix for 2 minutes at Sunbeam speed setting 5 (for 500 r.p.m.).
[2] Mix additional 2 minutes at speed 5.

When 1,2-distearin hydrogen glutarate and 1-monostearin dihydrogen adipate are substituted for the 1,3-distearin hydrogen succinate in the shortening of the above cake, substantially similar improvement in cake volume is obtained in comparison with the above standard plastic shortening which does not contain the mono- and diacyl glycerol hydrogen dicarboxylate additive.

The above plastic shortening containing 0.5% by weight 1,3-distearin hydrogen succinate also had a very desirable smoke point of 425° F. This compared favorably with the 365° F. smoke point of a standard commercially available plasticized vegetable oil shortening containing conventional mono- and diglyceride emulsifiers. The smoke point was determined according to A.O.C.S. standard method CC 9a–48. An open cup (for flash and fire test) was filled to the meniscus marker with fat at approximately 50° C. The fat sample was heated rapidly to within 75° F. (24° C.) of the smoke point; and then the flame was regulated so that the temperature of the oil increased 10°±1° F. (5.55°±0.555° C.) per minute. The smoke point was taken as the temperature at which the fat gave off continuously a thin blue smoke. In view of its high smoke point, the improved shortening of the invention containing the 1,3-distearin hydrogen succinate is suitable for general purpose frying.

The compounds of this invention also are effective high temperature batter stabilizers for cake batter systems containing alpha-phase crystal-tending emulsifiers, such use being described in the co-pending applications of Howard, U.S. Ser. Nos. 107,631, 107,632, and 182,955. Application No. 107,631 is now U.S. Pat. No. 3,145,107; No. 107,632 is now abandoned; and No. 182,955 is now U.S. Pat. No. 3,145,109.

Improved cream icings using liquid shortenings also can be obtained with the new compounds of this invention. For example, the density of a standard cream icing employing 17% by weight of a commercially available liquid shortening consisting of partially hydrogenated soybean oil (Iodine Value 107) and 11% by weight of dissolved additives comprising propylene glycol mono- and distearate, mono-, di-, and triglyceride, and stearic acid was reduced from 1.19 to 0.76 g./cc. when 4% by weight 1-monostearin di-hydrogen succinate was incorporated in the shortening. The icing was prepared according to the following formula:

| Ingredients: | Weight in grams |
| --- | --- |
| Shortening | 88 |
| Non-fat dry milk solids | 21 |
| Sodium chloride | 2 |
| Powdered sucrose | 335 |
| Water | 59 |

All ingredients were combined in a 2-quart Hobart mixing bowl and mixed with a paddle for 5 minutes at speed No. 1 (Model C–100). After scraping down the sides of the bowl with a spatula, mixing was continued for another 10 minutes at speed No. 2.

When 2-monobehenoyl di hydrogen glutarate, 1,3-dioleoyl hydrogen succinate, and 1,2-dimyristoyl hydrogen diglycolate are substituted for the 1,3-distearin hydrogen succinate and 1-monostearin di hydrogen succinate in the above shortenings, substantially similar improvement in shortening properties are obtained. Products of mixed isomeric nature can be used instead of the isomerically pure compounds with similar results, if desired. For example, a mixture of 1,3-distearin hydrogen succinate and 1,2-distearin hydrogen succinate can be used in place of either isomer alone. Likewise, a mixture of mono- and distearin hydrogen succinates can be used in place of either the mono- or distearin hydrogen succinates alone with similar results.

Examples 3 and 4 below, illustrate preparations of products of mixed isomeric nature and products of mixtures of mono- and di fatty acid structures, respectively.

EXAMPLE 3

1,3-distearin (0.86 mole), succinic anhydride (2.35 moles), and 2.6 liters of xylene were mixed in a 5 liter flask equipped with a stirrer and thermometer. The sample was heated at a temperature in the range of 130° C. to 140° C. for 6 hours. The product was poured into 8 liters of water and 2.4 liters of xylene were added. The xylene solution was separated and water washed twice and dried with anhydrous sodium sulfate. The xylene solution was diluted with 4.5 liters of hexane and the sample was crystallized at 50° F. The crystals recovered at 50° F. were recrystallized from 6 liters of hexane at 70° F. with a yield of 436 grams (0.6 mole) of product. Thin layer chromatographic examination revealed the product to be a mixture of the two isomeric di fatty acyl glycerol hydrogen succinates. The amounts of the two isomers were estimated to be 85% 1,2-distearin hydrogen succinate and 15% 1,3-distearin hydrogen succinate. The product had an acid value of 80.9 in good agreement with 77.5 as the calculated acid value.

EXAMPLE 4

Mixed mono- and diglycerides of hydrogenated soybean oil, iodine, value—8, (250 grams) were reacted with succinic anhydride (100 grams) in 1000 ml. of xylene. The sample was heated at 130° C. to 140° C. for six hours. The product was poured onto ice and allowed to stand overnight (about 12 hours). The xylene layer was diluted with three liters of ethyl ether and the organic phase was separated. The organic phase was water washed three times and then dried with anhydrous sodium sulfate. The mono- and distearin hydrogen succinate product was recovered by evaporation of the solvent under a pressure of 10 to 20 mm. with warming at 90° C. to 100° C. The yield of product was 326 grams. The product had an acid value of 110, saponification value of 352 and hydroxyl value of 10 in comparison with the following values for the starting mono- and diglyceride concentrate: acid value—4.7; saponification value—173; and hydroxyl value—167.

The mono- and diacyl glycerol hydrogen dicarboxylates of this invention when used in cake baking can be added directly to the cake batter system during the mixing step but preferably are premixed with the shortening component of the batter. These compounds also can be used in dry cake mixes as a separate dry ingredient or as an ingredient in the shortening component of the dry mix. They are preferably used for cake baking and for other shortening-containing foods in an amount of from about 0.1 to about 8% by weight of the shortening.

Dry cake mixes embodying the concept of the invention may be formulated for any of a variety of types, such as yellow, white, chocolate, devil's food, marble, spice, coconut, lemon, banana, burnt sugar, cherry, mint, pound cakes, and so on. The following examples illustrate yellow and chocolate type cakes, respectively, all proportions by weight.

Yellow type cake:

| Ingredients: | Percent |
|---|---|
| Sugar | 35–50 |
| Flour | 35–50 |
| Shortening | 9–15 |
| Non-fat dried milk solids | 0.5–5.0 |
| Salt | 0.5–2.0 |
| Leavening | 1.0–4.0 |
| Egg solids | 0–5.0 |
| Flavoring (including spices) | 0.1–5.0 |
| Coloring, minor amount, if any. | |

Chocolate type cake:

| Ingredients: | Percent |
|---|---|
| Sugar | 35–40 |
| Flour | 25–40 |
| Shortening | 9–15 |
| Non-fat dry milk solids | 0.5–3.0 |
| Leavening | 1.0–4.0 |
| Cocoa | 4.0–8.0 |
| Salt | 0.5–2.0 |
| Flavoring | 0.1–1.0 |
| Coloring, minor amount, if any. | |

Icings embodying the concept of the invention may be formulated for any of a variety of types, such as chocolate, vanilla, creamy, fluffy, and so on. The following example illustrates a chocolate type icing, all proportions by weight.

Chocolate type:

| Ingredients: | Percent |
|---|---|
| Water | 10–25 |
| Sugar | 45–75 |
| Shortening | 5–30 |
| Salt | 0.1–1.0 |
| Non-fat dried milk solids | 1–5 |
| Cocoa | 5–10 |
| Flavoring | 0.1–2 |

The term "shortening" is used herein to define any of the conventional edible glycerides derived from animal, vegetable or marine fats and oils. These fats and oils such as cottonseed oil, rapeseed oil, soybean oil, coconut oil, palm oil, peanut oil, sesame seed oil, sunflower oil, safflower oil, sardine oil, lard and tallow, generally comprise triglycerides containing higher fatty acid radicals having from about 12 to about 22 carbon atoms. The shortening can be solid, semi-fluid, and liquid in physical structure and can contain minor amounts of conventional shortening additives such as the mono- and diglycerides of the higher fatty acids.

The dry cake mixes and cake batters in which the compounds of this invention are employed can contain any of the conventional cake ingredients, such, for example, as flour, sugar, salt, protein matter such as milk solids and egg white, starch, flavoring, coloring, and the above-mentioned shortening. The icings can contain any of the conventional icing ingredients such as sugar, water, protein, flavoring, coloring, and the above-mentioned shortenings.

What is claimed is:

1. A shortening comprising a triglyceride fat or oil and from about 0.1% to about 8%, by weight of the shortening, of additive which is half ester of dicarboxylic acid containing from 4 to 6 carbon atoms with mono- or diacyl glycerol, said acyl radicals having from 12 to 22 carbon atoms, the glycerol residue in said additive being completely esterified.

2. The shortening of claim 1 wherein the half ester of dicarboxylic acid is succinic acid and the fatty acid radicals are stearic acid.

3. The shortening of claim 2 wherein the additive is 1,3-distearin hydrogen succinate.

4. The shortening of claim 2 wherein the additive is 1-monostearin di hydrogen succinate.

References Cited

UNITED STATES PATENTS 3,370,958   2/1968   Freund _____ 99—118 X

MAURICE W. GREENSTEIN, Primary Examiner

U.S. Cl. X.R.

99—92, 94, 139